United States Patent
Tan et al.

(10) Patent No.: US 10,139,881 B2
(45) Date of Patent: Nov. 27, 2018

(54) INFORMATION HANDLING SYSTEM PORT POWER MANAGEMENT AND CABLE DETECT

(71) Applicant: Dell Products L.P., Round Rock, TX (US)

(72) Inventors: Geroncio O. Tan, Austin, TX (US); Merle J. Wood, III, Round Rock, TX (US); Mohammed K. Hijazi, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 145 days.

(21) Appl. No.: 15/008,626

(22) Filed: Jan. 28, 2016

(65) Prior Publication Data

US 2017/0220088 A1 Aug. 3, 2017

(51) Int. Cl.
*G06F 1/26* (2006.01)
*G06F 13/40* (2006.01)
*G06F 13/42* (2006.01)

(52) U.S. Cl.
CPC .......... *G06F 1/266* (2013.01); *G06F 13/4022* (2013.01); *G06F 13/4068* (2013.01); *G06F 13/4282* (2013.01); *Y02D 10/14* (2018.01); *Y02D 10/151* (2018.01)

(58) Field of Classification Search
CPC .............. G06F 13/266; G06F 13/4022; G06F 13/4282; G06F 13/4068
See application file for complete search history.

(56) References Cited

U.S. PATENT DOCUMENTS

| | | | |
|---|---|---|---|
| 8,738,952 B1 * | 5/2014 | Lachwani | G06F 1/3287 710/100 |
| 9,017,092 B1 | 4/2015 | McCracken | |
| 2006/0222055 A1 * | 10/2006 | Khodorkovsky | H01R 13/7038 375/142 |
| 2006/0287007 A1 * | 12/2006 | Veselic | H04B 1/1607 455/572 |
| 2007/0004467 A1 | 1/2007 | Chary | |
| 2007/0241732 A1 * | 10/2007 | Luo | H02J 7/0055 323/281 |
| 2010/0312965 A1 * | 12/2010 | Cooke | G06F 13/4068 711/115 |
| 2011/0016333 A1 * | 1/2011 | Scott | G06F 1/266 713/300 |
| 2011/0113174 A1 * | 5/2011 | Fang | G06F 13/4081 710/300 |
| 2012/0091824 A1 * | 4/2012 | Campolo | B60L 11/1818 307/135 |
| 2012/0151240 A1 * | 6/2012 | Robinson | G06F 1/263 713/340 |

(Continued)

*Primary Examiner* — Tim T Vo
*Assistant Examiner* — Phong H Dang
(74) *Attorney, Agent, or Firm* — Zagorin Cave LLP; Robert W. Holland

(57) ABSTRACT

An information handling system allocates power for internal use and to support peripheral device operations by managing bi-directional power transfer at plural cable ports. A motion detector disposed in a port detects motion of a cable disconnecting from the port and communicates the motion to a power controller that coordinates termination of power draw from the cable before the power connection between the cable and port is lost.

20 Claims, 15 Drawing Sheets

(56) References Cited

U.S. PATENT DOCUMENTS

| | | | |
|---|---|---|---|
| 2012/0173770 A1* | 7/2012 | Walker | G06F 3/038 |
| | | | 710/15 |
| 2013/0069583 A1 | 3/2013 | Lemelman et al. | |
| 2013/0200857 A1 | 8/2013 | Kim et al. | |
| 2013/0290746 A1 | 10/2013 | Lee et al. | |
| 2013/0322462 A1 | 12/2013 | Poulsen | |
| 2014/0184143 A1 | 7/2014 | Coakley et al. | |
| 2014/0310537 A1 | 10/2014 | Messick | |
| 2015/0077926 A1 | 3/2015 | Schneider | |
| 2015/0269102 A1* | 9/2015 | Inha | G06F 13/385 |
| | | | 710/14 |
| 2015/0270733 A1 | 9/2015 | Inha | |
| 2016/0085280 A1* | 3/2016 | Harel | G06F 1/263 |
| | | | 710/14 |
| 2016/0092393 A1 | 3/2016 | Nge et al. | |
| 2017/0177053 A1* | 6/2017 | Browning | G06F 1/28 |
| 2017/0220087 A1* | 8/2017 | Hijazi | G06F 1/26 |
| 2017/0222446 A1* | 8/2017 | Tan | H02J 7/007 |

\* cited by examiner

INFORMATION HANDLING SYSTEM PORT POWER MANAGEMENT AND CABLE DETECT

BACKGROUND OF THE INVENTION

Field of the Invention

The present invention relates in general to the field of information handling system cabled connections, and more particularly to information handling system multiport power management.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems continue to shrink in size and grow in capabilities. Improvements in processing capabilities have allowed information handling system manufacturers to pack increased processing capability into housings of decreased size while increasing battery life with power savings measures. In particular, many end users appreciate information handling systems that have thin housings for ease of mobility and that have power savings logic and large batteries for increased operating times when external power is not available.

One difficulty faced by information handling system manufacturers when designing low-profile portable systems is providing the amount of power that processing components need when operating at full capacity. Often, portable information handling systems include powerful components that will draw current at rates in excess of the rates that an external power supply can provide. Power saving logic drives down current draw during idle operations, however, initiation of an application or hardware operation tends to spike power consumption and thus current draw in large variances that can occur unexpectedly. As one example, many tablet information handling systems powered by USB adapters cannot power up through a boot sequence without a battery charge to supplement external power.

Thin housings used for low-profile information handling systems present several difficulties for power solutions acceptable to the large power consumption variance that can occur. One difficulty is that power and communication connectors located along the housing edge have minimal space. In small tablet configurations, a single USB connector is sometimes used for both power can communication. Larger tablet configurations and clamshell/convertible configurations tend to have additional cable connections, such as a dedicated power connector and display connector as well as multiple USB and other data connectors; however, the housing edge space comes at a premium in thin solutions due to structural and electrical considerations. Even where a dedicated power connector is included, the space available for power management, such as capacitors to manage power surges, is minimal, as is the space available for a battery.

One recent trend that aids power management is the use of various peripheral ports to both send information and generous amounts of power. USB Type C connectors and ports, for example, may provide as much as 100 W of power. DisplayPort connectors and ports using a USB type of interface support similar power transfer amounts. In addition, power transfer is bi-directional so that an information handling system can provide power to peripheral devices or can receive power when interfaced with a device capable of providing power. However, since many ports have similar footprints designed to take minimal housing space, end users face some confusion regarding which port is appropriate for which cable. Further, an end user may not understand that a peripheral port is providing power to an information handling system or, in some cases, which peripheral port is providing power, so that the end user will expect similar performance at an information handling system as cables are inserted and removed. In fact, the availability of external power can impact the capability of processing components to operate at full capacity. Further, connecting and disconnecting external power in an unexpected manner can introduce unpredictable power surges that lead to system crashes or component failures.

SUMMARY OF THE INVENTION

Therefore, a need has arisen for a system and method which provides power to an information handling system in a flexible manner.

In accordance with the present invention, a system and method are provided which substantially reduce the disadvantages and problems associated with previous methods and systems for powering an information handling system. A power manager monitors power sources coupled to data and power ports of an information handling system to selectively accept power simultaneously from plural power sources. Available power state configurations are tracked and presented to an end user with a user interface that optimizes power transfer at the information handling system for a given operating condition, such as based on available power sources, battery charge, system power consumption states, data transfer needs, etc. . . . Power and data ports are monitored for cable motion so that changes in power state are anticipated and adapted to at the information handling system without disrupting system operation.

More specifically, an information handling system processes information with a processor and memory disposed in a housing. The housing has plural ports that accept power cables and data cables, such as USB Type C connectors and DisplayPort connectors. An embedded controller running power manager firmware code stored in flash memory manages power at the information handling system, including accepting power from external sources at a charger to apply the power to run components and charge a battery. The power manager reports available power to a user interface at an operating system level so that an end user is presented with available power states based upon the power capabilities of external devices, such power adapters and peripheral devices configured to provide power to the information handling system through USB Type C cables and ports. The power manager configures multiple power sources to match power impedance so that the multiple sources are able to simultaneously provide power to the information handling system. Cable ports are monitored for motion of a cable that indicates a power source may be disconnected so that the power manager can adapt the system to changes in the power source configuration before the change occurs. In one embodiment, a power cable is connected with magnetic pogo pins that are reversibly connectable. A center pin provides ground and two outer pins provide communication and power so that the power manager detects the outer pin function before configuring the power source for power transfer using the communication pin.

The present invention provides a number of important technical advantages. One example of an important technical advantage is that an end user is provided with a user interface that allows the end user to understand and manage power application from multiple external devices so that the end user can select optimal power and data transfer configurations. Multiple power sources couple to an information handling system provide power simultaneously to improve power efficiency and ensure that full power is available to the information handling system when any one power source is not sufficient to meet the information handling system's power needs. Active monitoring of cable connections at the information handling system provide a transition time between a cable disconnect and power loss so that the information handling system reconfigures to new power source configurations before existing power supply is lost from a disconnecting source. In one embodiment, a reversible magnetic power connector provides power and communication for coordinating power transfer through three pin connector having the ground pin in a center location.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system accepts power from multiple power sources, including peripheral devices, by intelligently managing power transfer between the multiple power sources. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
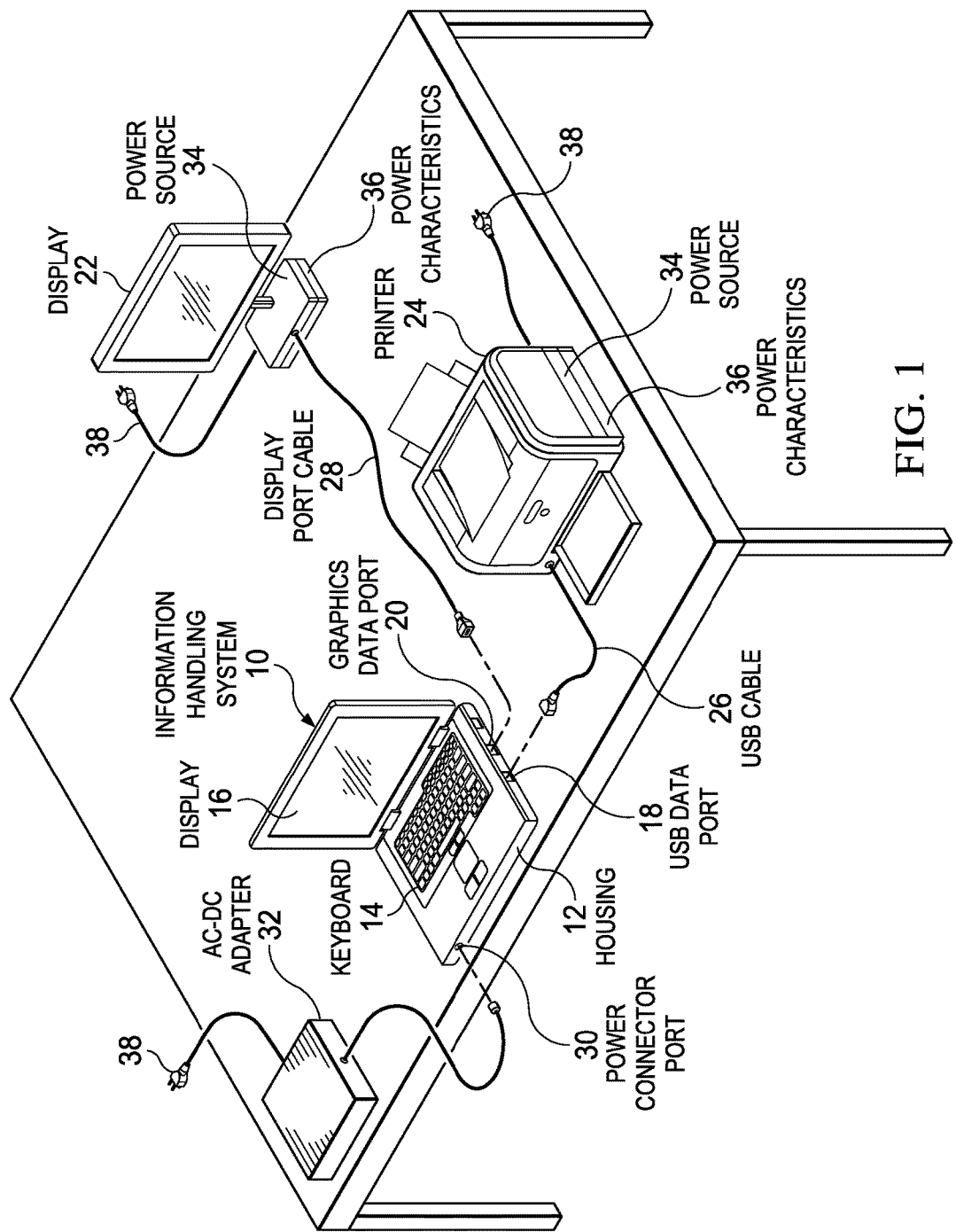
FIG. 1 depicts a portable information handling system interfaced with plural peripheral devices that provide power.

Referring now to FIG. 1, a portable information handling system 10 is depicted interfaced with plural peripheral devices that provide power. In the example embodiment, portable information handling system 10 has a convertible configuration with housing 12 having a keyboard 14 integrated in a main portion and a display 16 integrated in a lid portion rotationally coupled to the main portion. For instance, portable information handling system converts between closed, clamshell open and tablet configurations. In alternative embodiments, alternative housing configurations may be supported, such as tablet configurations and desktop configurations. Information handling system 10 obtains power to run components and charge an integrated battery through data ports that that communicate information and also include power transfer wires, such as a USB data port 18 and a graphics data port 20. For example, a Type C USB 18 port accepts USB cables 26 from a peripheral display device 22, a printer 24 or other types of peripheral devices that have bi-directional power transfer to both receive power from information handling system 10 and provide power to information handling system 10. As another example, a DisplayPort port 20 accepts a DisplayPort cable 28 from peripheral display device 22 to both receive power and transfer graphics data from information handling system 10 to display 22. In addition to receiving power from peripheral devices, information handling system 10 has a power connector port 30 that accepts power from an AC-to-DC adapter.

In operation, information handling system 10 configures to receive and provide power with external devices based upon communications with each external device. Power connector port 30 includes a Type C CC or vendor specific PSID communication with AC-to-DC adapter 32 that exchanges power characteristics so that information handling system 10 draws an appropriate current without overloading adapter 32. Serial data ports 18 and graphics ports 20 include dedicated data lines defined by a communications protocol, such USB 3 or DisplayPort protocols, which also defines power transfer handshakes. For example, each peripheral includes a power source 34 that provides power locally to run the peripheral, such as from an external power source 38 or from power provided by information handling system 10 through data cable. In addition, in some instances power sources 34 may provide power to information handling system 10 through the data cable. The capability of each peripheral device is communicated with power characteristics through the data cable, such as with the USB or DisplayPort protocols. Information handing system 10 receives and sends power between each external device based upon the communicated capabilities and configuration of each external device. For example, information handling system 10 may take power from some peripheral devices while providing power to run other peripheral devices based upon the capability of an external power adapter 32.

Figure 2:
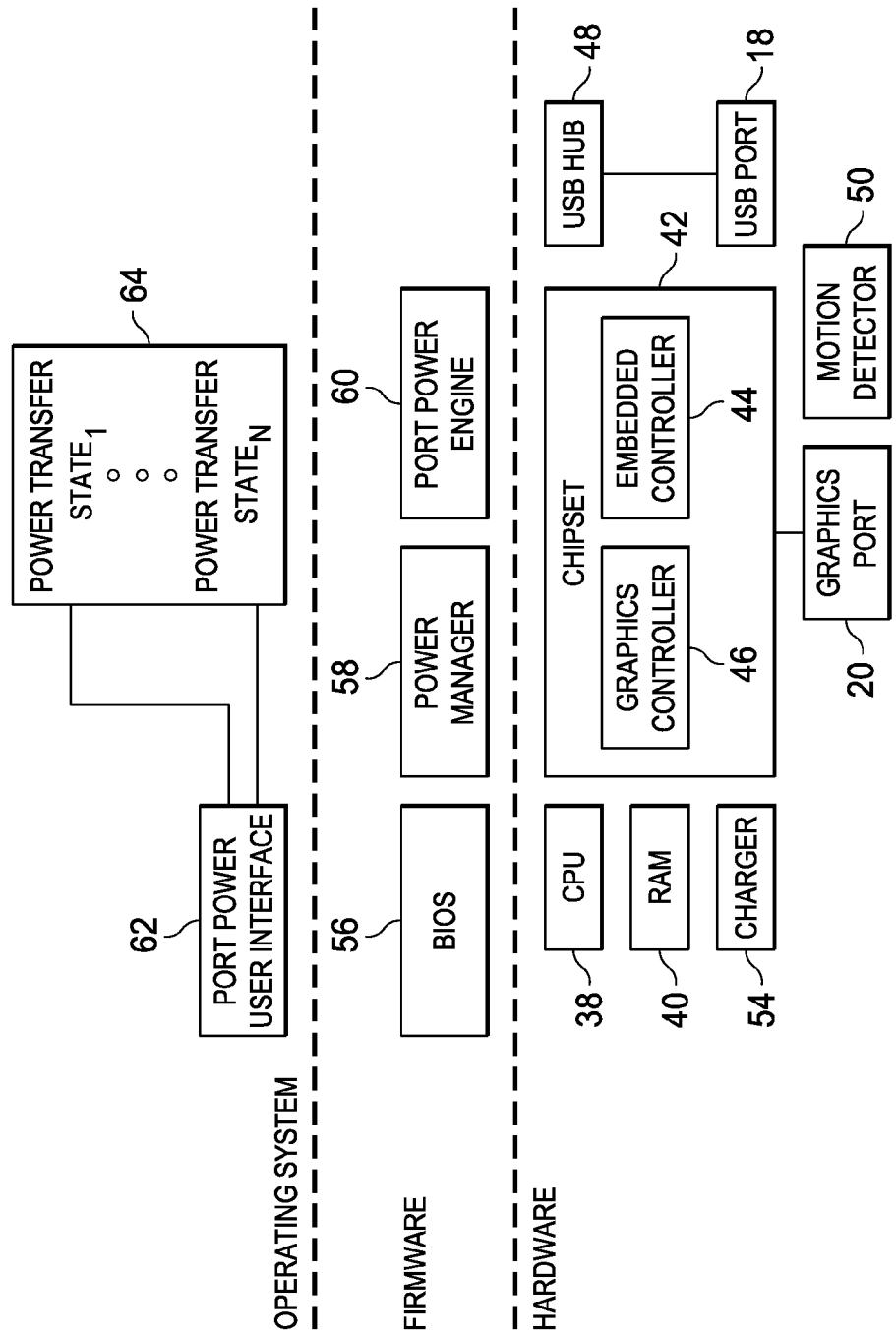
FIG. 2 depicts a block diagram of an information handling system configured to manage application of power from plural power sources.

Referring now to FIG. 2, a block diagram depicts an information handling system 10 configured to manage application of power from plural power sources. A hardware layer includes processing resources to store and execute instructions. For example a central processing unit (CPU) 38 executes instructions in combination with a random access memory (RAM) 40. A chipset 42 includes processing resources and flash memory that execute firmware instructions. For instance, an embedded controller 44 manages communication with power resources and input/output devices. A graphics controller 46 manages communication with integrated and external graphics devices, such as by generating pixel values for presentation of visual images at a display communicated through graphics port 20. Embedded controller 44 interfaces with a USB hub 48 or other type of serial port hub to manage communication of data and power at USB port 18. Movement of cables into and out of ports 18 and 20 is monitored by a motion detector 50, as set forth in greater detail below. A charger 54 adapts power for specific uses, such as charging a battery or powering various busses with various voltage and current levels.

The hardware layer is managed at a physical level by instructions stored in persistent memory as firmware in a firmware layer. Generally, physical component interactions are managed by a Basic Input/Output System (BIOS) or similar device running on embedded controller 44 and/or related microprocessors. For example, BIOS 56 includes modules that manage power, such as a power manager 58 and a port power engine 60, both described in greater detail below. BIOS 56 interacts with an operating system layer to provide information to and accept inputs from an end user. For example, a port power user interface 62 presents to the end user the available power transfer states 64 so the end user may select cable and port connections that provide optimal power transfer configurations for the end user. As an example, port power engine 60 detects connections for USB ports 18 and graphics ports 20 with peripheral devices and analyzes the power capabilities of each peripheral device to suggest the port and cable connections that will provide the most rapid battery charge. If, for instance, an end user plugged a USB Type C display into a port that is not DisplayPort ALT mode capable, the end user is provided with a graphical suggestion of a port location on the information handling system that will provide power transfer with the Type C display. In one example embodiment, the end user is presented with a user interface that depicts various combinations of port connections and the power transfer state of each combination. Port power engine 60 monitors all port plug status changes and port instantaneous power draws to maintain a port status table referenced by port power user interface 62. Port power engine 60 manages power transfer at the plural ports based upon detected port cable connections, detected power source and detected power transfer configurations, including peripheral devices that source and/or sink power. By tracking total instantaneous port power allocation and system power budgets, port power engine 60 dynamically adjusts system resources based on the system and plugged device power status changes to direct the user through power user interface 62 of an appropriate match of peripheral capabilities to port capabilities. This active monitoring helps to ensure that peripheral devices that draw power will also have adequate power through available port resources, such as when a peripheral device that was providing power transitions to receiving power from the information handling system. As an example, when on battery power, port power engine may suggest use of a display having less power consumption to present information; on the other hand, if the displays have external power to provide to the information handling system, port power engine may suggest power be provided from the display having the greatest power transfer rate. In one embodiment, other factors may be considered, such as video quality when visual images are presented by streaming using battery versus external power.

Figure 3:
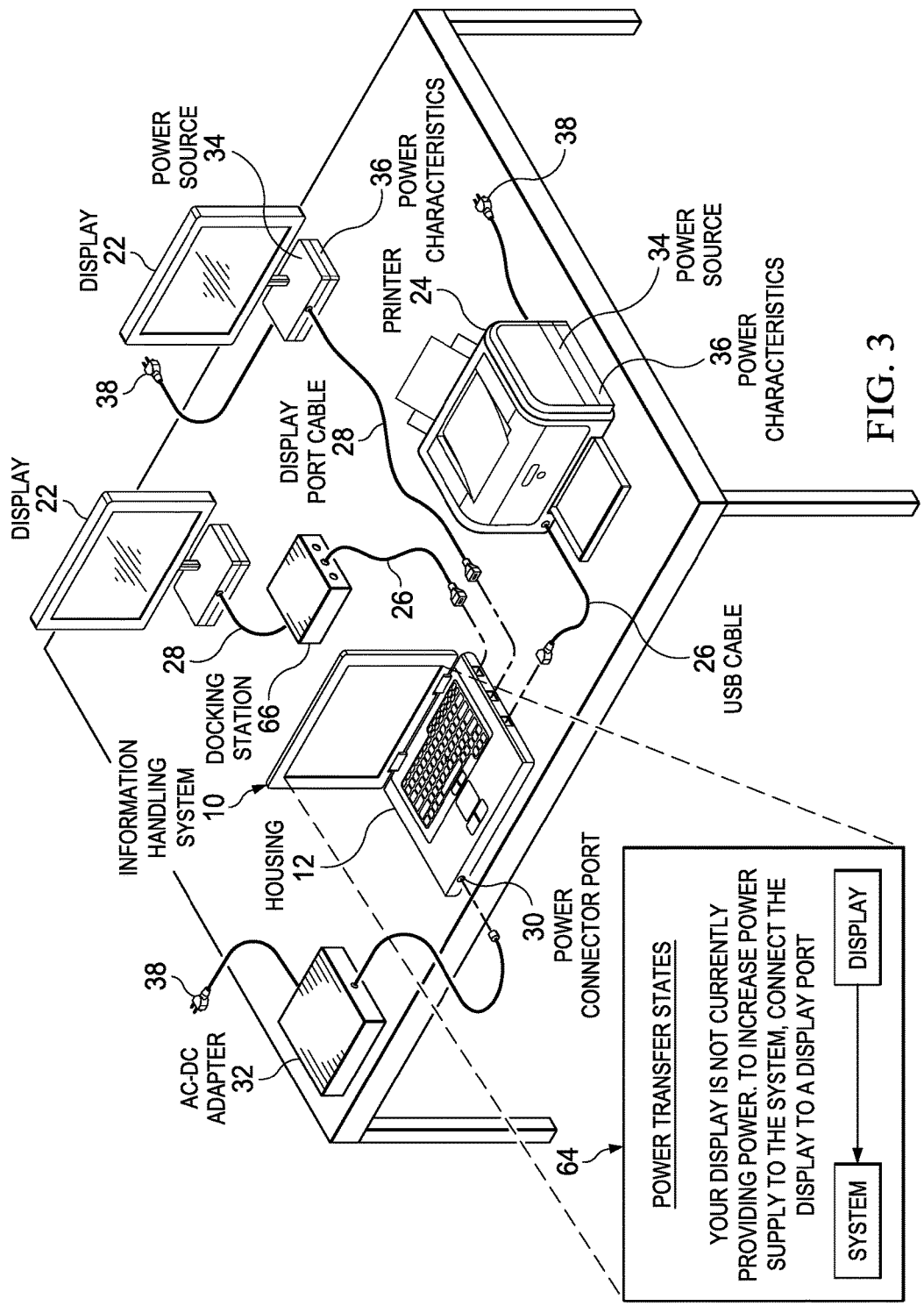
FIG. 3 depicts a user interface presented at an information handling system that aids end user configuration of external device connections to enhance power transfer from multiple external sources.

Referring now to FIG. 3, a user interface 64 presented at an information handling system 10 is depicted that aids end user configuration of external device connections to enhance power transfer from multiple external sources. Information handling system 10 detects all cables connected to ports, the presence/absence of an external power adapter 32, a battery charge state and data transfer configurations, and then presents available power transfer states at user interface 64, such as power states available to accept external power and to power external devices. In the example embodiment, an end user is informed that a display coupled to a port is not currently providing power and is pointed to a different port that the end user can use that will provide power transfer from the display to the information handling system. User interface 65 depicts different power transfer states based upon power use and need, and also based upon data use and need. For example, a docking station provides an interface with a display 22 and power through a USB Type C cable. If information handling system 10 has a low battery charge and display 22 provides power, user interface 64 presents the option of directly coupling display 22 to a DisplayPort port of information handling system 10 to increase charge rate by accepting power from both display 22 and the docking station. If printer 26 does not provide power through its cable, user interface 64 suggests interfacing printer 26 through the docking station to open up a port for a direct connection by display 22 that can provide power. If, on the other hand, information handling system 10 has a full battery charge and power provided by the docking station is adequate for running processing components, user interface 64 will not disrupt the end user with other power and data cable configurations. Other situations that may arise include power transfer from information handling system 10 to a peripheral, such as display 22, where the display does not have its own power source. For example, user interface 64 may suggest unplugging a display 22 that draws power during battery charge so that the full power capability of the system is available to charge the battery instead of running peripheral devices. In such an example situation, user interface 64 will suggest swapping a display 22 that provides power and is connected to a docking station with a display 22 interfaced directly to an information handling system port that does not provide power or draws power. As another example, where power into an information handling system can be supplemented by a fully-charged battery as needed, a lower power-in state may be suggested for a configuration that will provide a greater data transfer, such as where a user is streaming a move.

Figure 4:
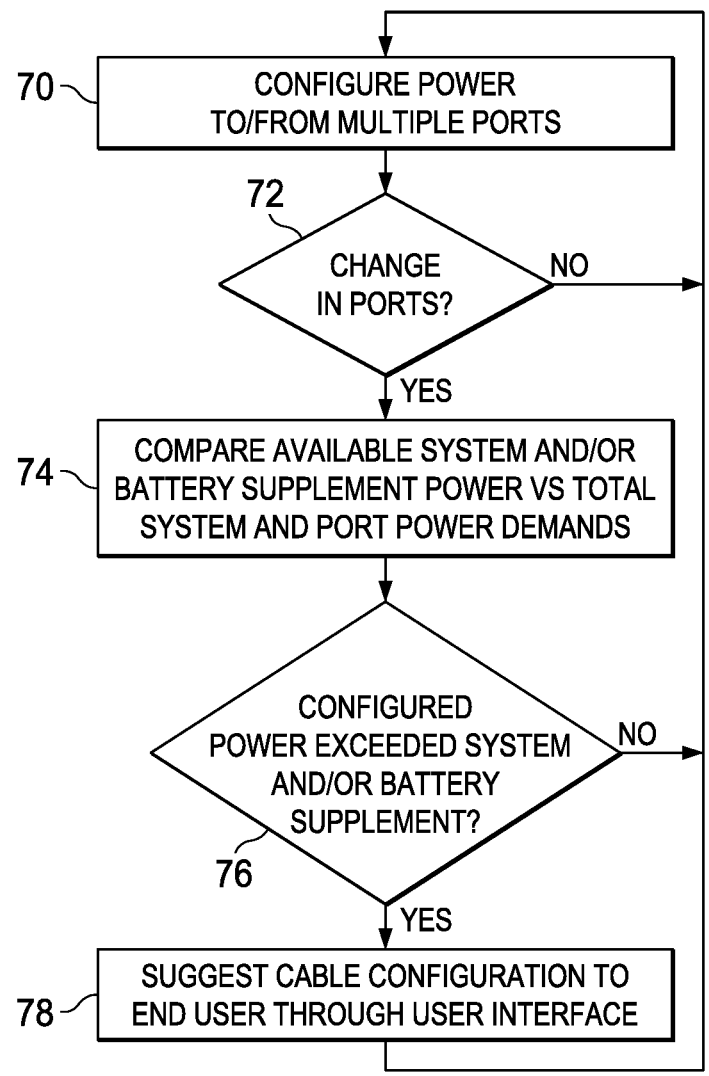
FIG. 4 depicts a flow diagram of a process for presenting end user cable configurations that enhance power transfer.

Referring now to FIG. 4, a flow diagram depicts a process for presenting end user cable configurations that enhance power transfer. At step 70, connections at each port are queried for power configuration parameters and each port is configured to accept or provide power as appropriate. In various embodiments, two or more ports may simultaneously receive power from external devices, such as a power adapter or a peripheral. At step 72, the ports are monitored to detect any change is port connections, and if no change is detected the process returns to step 70. If a change in port configuration is detected at step 72, the process continues to step 74 to compare the configured power into the information handling system with the available power from the newly detected port configuration. At step 76 a determination is made of whether a configuration is available with more power available to the information handling system than in the present configuration. If not the process continues to step 70. If a configuration with more power transfer is available, the process continues to step 78 to suggest a modified cable configuration to the end user through the power state user interface.

Figure 5:
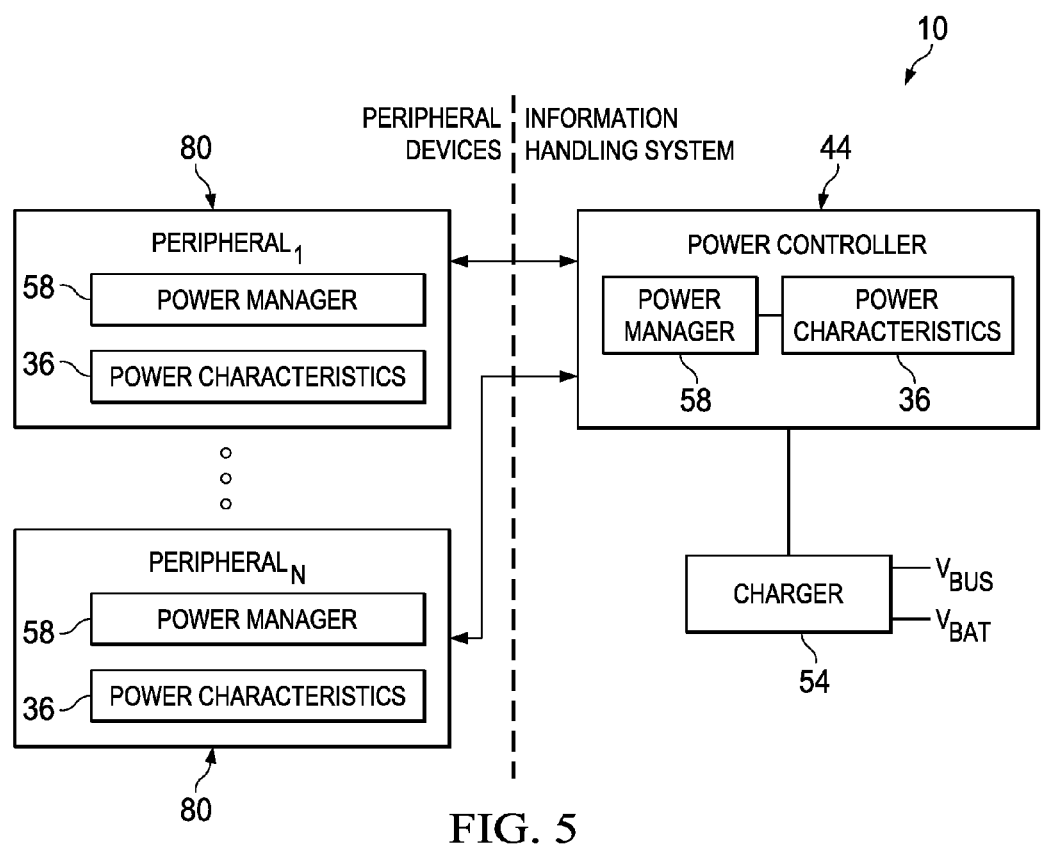
FIG. 5 depicts a block diagram of an information handling system configured to adapt plural external power source impedances to maintain a common system droop.

Referring now to FIG. 5, a block diagram depicts an information handling system 10 configured to adapt plural external power source impedances to maintain a common system droop. Information handling system 10 has a power controller 44, such as embedded controller, that manages system power through a charger, such as by outputting power to one or more system busses sourced from external power or a battery. For example, a power manager 58 includes local power characteristics 36 that the power controller communicates with external power sources to manage power transfer. Power manager 58 coordinates with multiple external power sources to accept power from plural sources simultaneously, such as from one or more power adapters and/or one or more peripheral devices 80. In the example embodiment, each of plural peripheral devices 80 includes a power manager 58 and locally stored power characteristics that are communicated with information handling system 10. By tracking power characteristics 36 of each external device coupled to it, each power manager 58 adjusts power output characteristics to provide power at a level that works with other devices simultaneously transferring power. For instance, in some example embodiments power is provided to an information handling system simultaneously through plural USB Type C ports, plural DisplayPort graphics ports, various combinations of USB data ports, graphics ports and power adapter ports that are included to transfer power without data (other than power source identification and characteristics).

In one example, power manager 58 of information handling system 10 identifies with USB and DisplayPort power handshakes the output rating of each attached peripheral device using digital communication lines. For peripheral devices that have compatible power transfer capabilities, the power manager 58 commands an output impedance that each peripheral device 80 configures itself to output so that the power output of each peripheral device matches during changes of current draw by information handling system 10. In one example embodiment, the power manager 58 of information handling system 10 retrieves the current rating of each peripheral device 80 and applies the information handling system voltage droop to determine a peripheral device impedance setting according to the formula:

$$Rout_{imp} = \frac{V_{droop}}{Isource_{rating}}$$

Where;
  $Rout_{imp}$ Adapter output impedance.
  $Vsys_{droop}$ System Droop allowed from nominal.
  $Isource_{rating}$ Source power rating.

Alternatively, power manager 58 communicates a voltage droop setting to each power-capable device 80 so that each device 80 sets an output impedance that will match that provided from information handling system 10. The programmed output impedance will be system dependent and inversely proportional to the current rating of each peripheral device 80. For example, with two peripheral devices 80 coupled to information handling system 10 having a system output voltage droop of 200 mV over the system demand, a source rated at 2.5 A and a source rated at 4.5 A would set their output impedance at 80 mOhms and 40 mOhms respectfully. In the event that the output impedance is determined at the peripheral device 80, information handling system 10 provides the voltage droop so that the peripheral device may compute the output. Advantageously, providing power from multiple external sources allows information handling system 10 to draw its maximum rated power where drawing current from just one external device would not provide maximum rated current. With matched impedance, all power sources will provide proportional power relative to the maximum power available. Power manager 58 can selectively adapt to receive power from just one device as desired during times of low power draw so that extra charger devices of peripheral devices may enter a power saving state. End users will not have an impact with reduced performance since a battery can supplement current draw until a second power source is returned to an active state. Operating power sources at moderate levels of current production helps to increase power transfer efficiency, which may be coordinated through transfer of power efficiency factors with the power characteristics 36.

Figure 6:
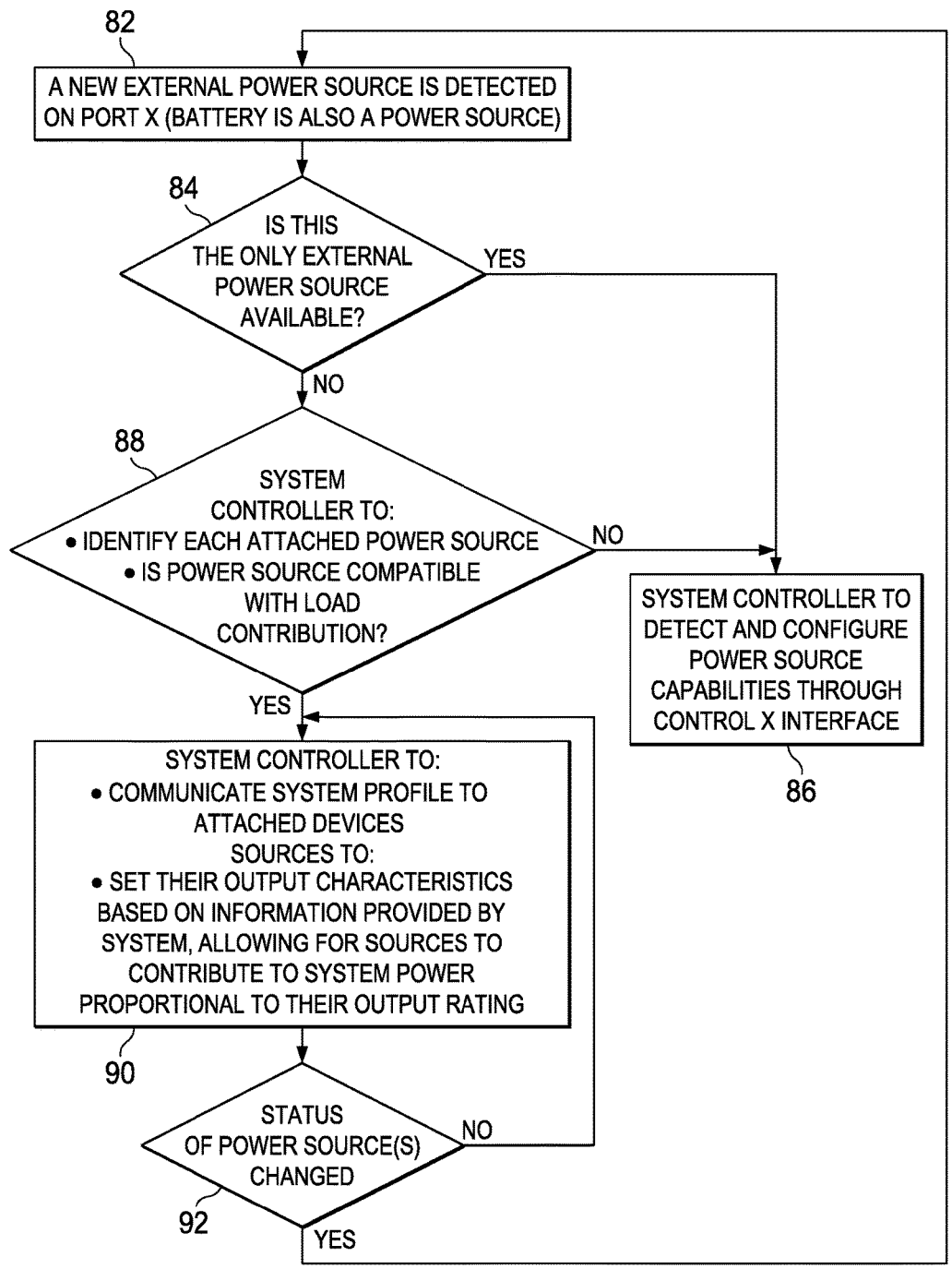
FIG. 6 depicts a flow diagram of a process to adapt plural external power source impedances to maintain a common system droop.

Referring now to FIG. 6, a flow diagram depicts a process to adapt plural external power source impedances to maintain a common system droop. At step 82 a new power source is detected at a device port, such as a power port that couples to a power adapter or a data port that couples to a data cable. At step 84 a determination is made of whether the new power source is the only available power source or one of multiple power sources. In one example embodiment, a power source may be considered as the only power source if the power source has adequate current to meet the maximum current draw of the information handling system. If the power source is the only power source, the process continues to step 86 for the system controller, such as a power manger running on an embedded controller, to detect and negotiate power source capabilities through a control interface, such as USB, DisplayPort, or PSID interfaces. If at step 84 the new power source is not the only power source, the process continues to step 88 for the system controller to identify each attached power source and confirm that the power sources are compatible with a multi-power source load contribution. If a power source is not capable of configuring for multiple power source sharing, then the source may be treated as the only source or turned off to prevent power contribution and the process continues to step 86 to configure power sources accordingly.

Once all power sources are identified that are compatible with power sharing, the process continues to step 90 to configure the power sources for power sharing. The system controller communicates the system power profile to each of the power sources, such as the allowed voltage droop at the system and the maximum current available from each power source. In response to the system power profile information, the information handling system and power sources set their power characteristics to desired settings. For example, based upon the voltage droop provided from the information handling system, each power source sets a matching power impedance to allow each power source to contribute to system power proportional to their output rating. At step 92, the status of the power sources is changed to reflect the updated impedance settings and the process returns to step 82 to monitor a change in status of power sources. If at step 92 the power sources do not match or successfully configure to share power contribution, the process returns to step 90 to reattempt configuration.

Figure 7A:
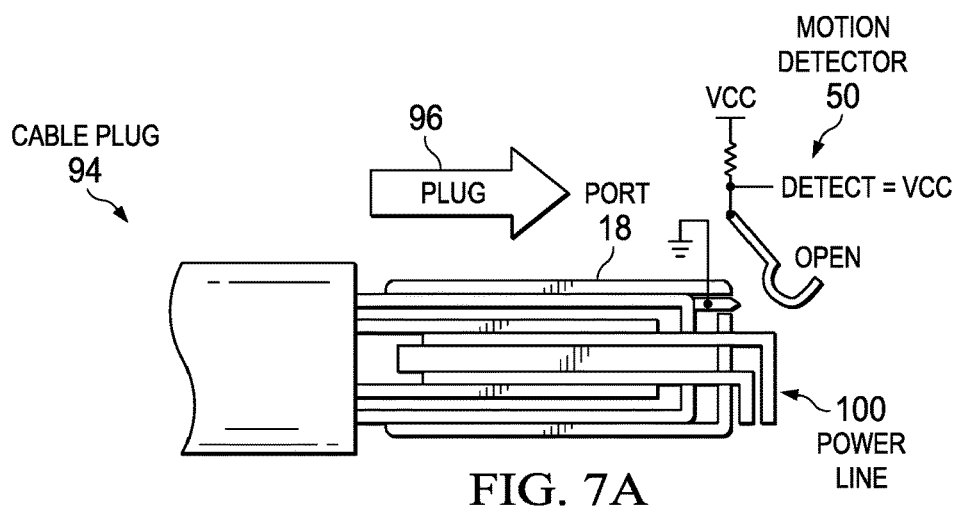
FIGS. 7A, 7B and 7C depict a data connector and port having a motion detector to provide a transition time for power transfer reconfiguration.
Figure 7B:
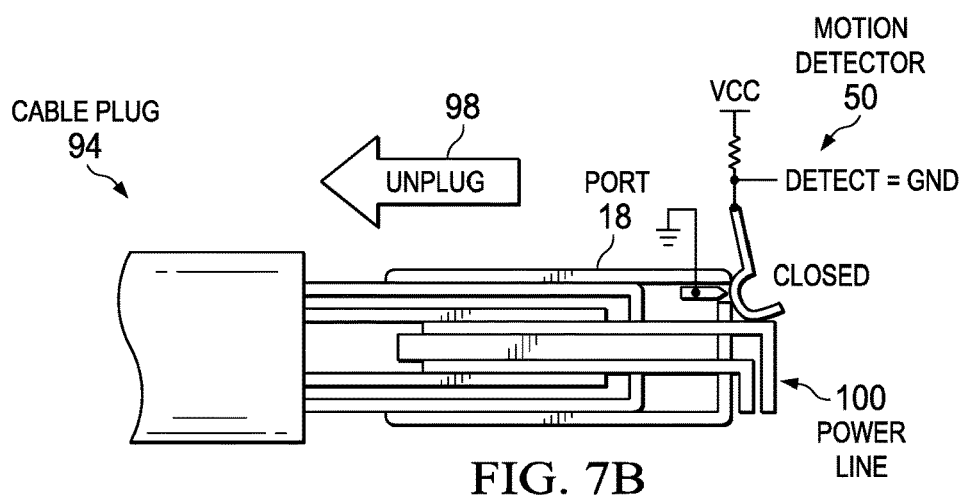
Figure 7C:
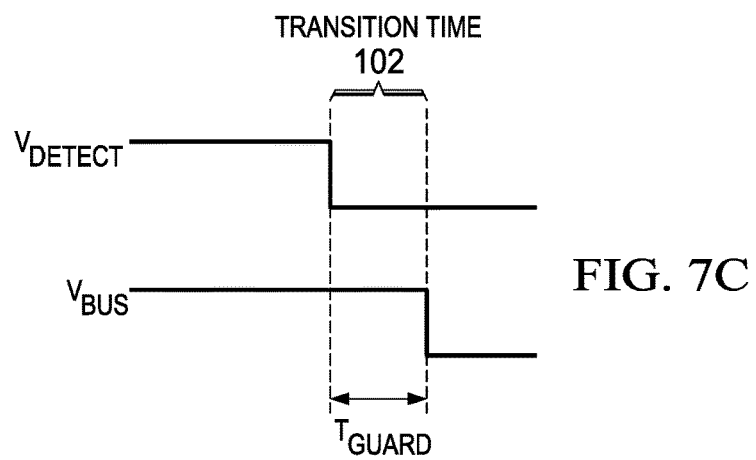

Referring now to FIGS. 7A, 7B and 7C, a data connector 94 and port 18 are depicted having a motion detector 50 to provide a transition time for power transfer reconfiguration. As presented in FIG. 7A, on full insertion of cable plug 94 into port 18, motion detector 50 is pressed backwards to provide a Vdetect signal that indicates full insertion of cable plug 94 into port 18. At full insertion, power lines 102 in port 18 receive power from power lines of cable plug 94 so that power is provided to an information handling system charger coupled to port 18. As presented in FIG. 7B, on initiation of withdrawal of cable plug 94 from port 18 motion detector 50 closes a switch that indicates a withdrawing motion has begun before power is removed from power lines 100 of port 18 since a power connection remains for at least part of the withdrawing motion as power lines of cable plug 94 remain in contact with power lines 100 in port 18. FIG. 7C illustrates that a transition time 102 is provided between the change in value of Vdetect and the change in power applied by cable plug 94 at Vbus. In a multi-plug power situation as described above with respect to FIG. 6, transition time 102 provides adequate warning to the power manager of a change in available external power so the power manager can reconfigure power into the information handling system before the available power in changes. Although FIG. 7 depicts a motion detector 50 in the form or a switch that is triggered by full or partial insertion of a plug, in alternative embodiments other types of motion detectors may be used, such as an infrared sensor that monitors plug 94 or a Hall sensor that uses magnetic interactions to detect motion or full insertion of plug.

Figures 8A, 8B:
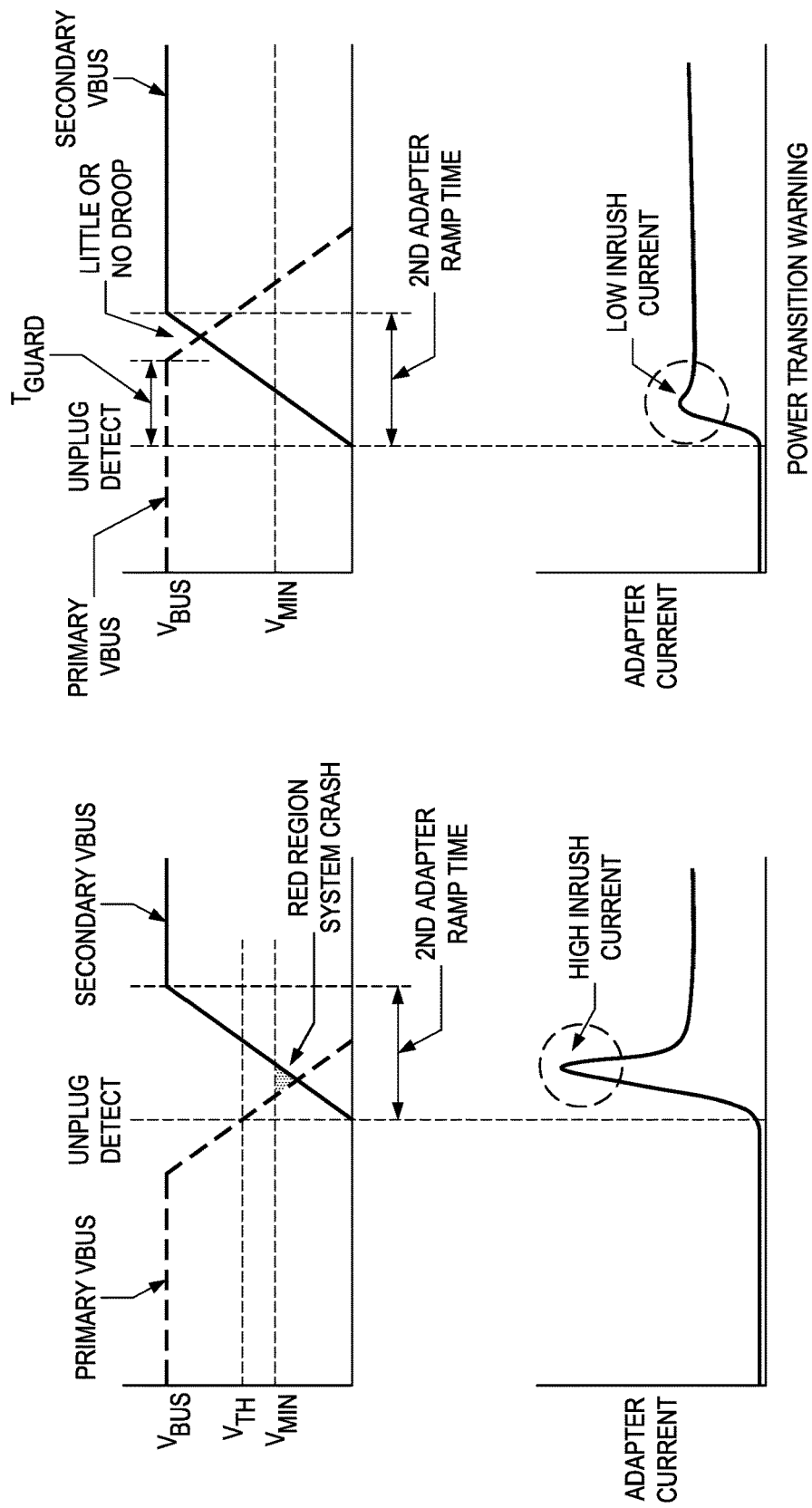
FIGS. 8A and 8B depict current levels at power source transition with and without the power transition time.

Referring now to FIGS. 8A and 8B, current levels at power source transition are depicted with and without the power transition time. Information handling system 10 has an allowed voltage droop that defines how much voltage is allowed to drop when current draw increases. In the event of an unplugging motion of a power source in a multi-power source configuration, voltage droop is expected when power ceases from the unplugged power source and until the power manager and remaining power source are able to re-establish the designed Vbus. System voltage is re-established by a combination of reducing current draw by the information handling system from the remaining power source and decreasing impedance of the remaining power source so that its current output increases. In order to absorb some of the increase current demand from the remaining power source during a transition time, capacitance may be added to the information handling system, however, such capacitance comes at a cost in both components and board space.

FIG. 8A depicts the increase in current draw and droop in voltage that can occur in one example embodiment at the unplugging of a power source without prior notice. Vbus drops at the unplug event to a Vth level that triggers a detection of a power source change. In response to the voltage droop caused by the primary Vbus unplug event, adapter current to supply power at a secondary Vbus spikes to a high current value in attempt to raise the system voltage to a target value. The ramp in current increase from the remaining power source stresses current output capacity and takes a ramp up time that can respond to slowly to maintain voltage at a level adequate to keep the information handling system running. In contrast, FIG. 8B depicts voltage and current response where a motion detector provides warning of an unplug event before power is cut off due to the unplug event. Upon motion detection at a port plug, the power manager responds by preparing the information handling system to run without power provided by the port. The transition may involve a variety of steps that will reduce the impact of a sudden loss of current from the port. For example, the power manager reconfigures the power transfer impedance for the two power sources to have power provided only by the power source that does not have motion detected. As another example, power provided from an integrated battery may supplement current before a disconnect of the cable from the port where motion is detected. Other examples may include reconfiguring of the information handling system to receive power from other cables and ports that have power transfer capability that is not in use. In each instance, the power transition warning provided by motion detection of a cable at a power-providing port gives the power manager time to initiate a transition to removal of the power source before the power source is lost so that the voltage droop and related current inrush are minimized. In FIG. 8B, the example embodiment initiates a power current increase available from the secondary power source before the primary power source is removed.

Figure 9:
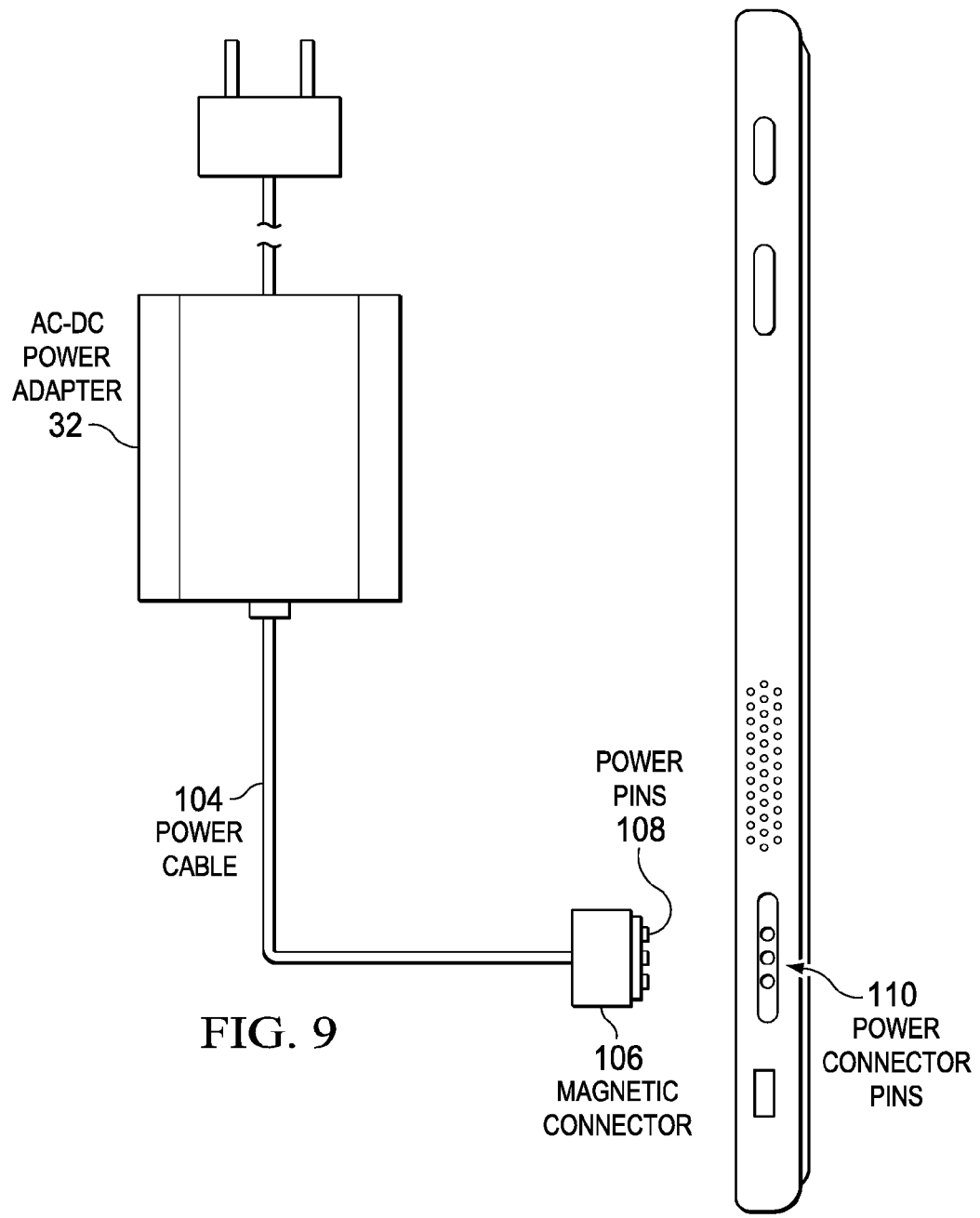
FIG. 9 depicts a three pin reversible magnetic connector that couples to a power source.

Referring now to FIG. 9, a three pin reversible magnetic connector 106 is depicted that couples to a power source. In the example embodiment, a power adapter 32 provides current through a power cable 104 to power connector 106 with three power pins disposed in a linear arrangement. Power pins 108 align with power connector pins 110 in a reversible manner. In the example embodiment, power pins 108 and power connector pins 110 couple together and are held together with magnetic attraction, such as by having a magnet and/or ferromagnetic material disposed in the housing of information handling system 10 and magnetic connector 106. In one embodiment, the pins include a spring bias that detects a separating motion of a cable from a housing to provide warning of a changed power configuration as set forth above with respect to motion detection.

Figure 10A:
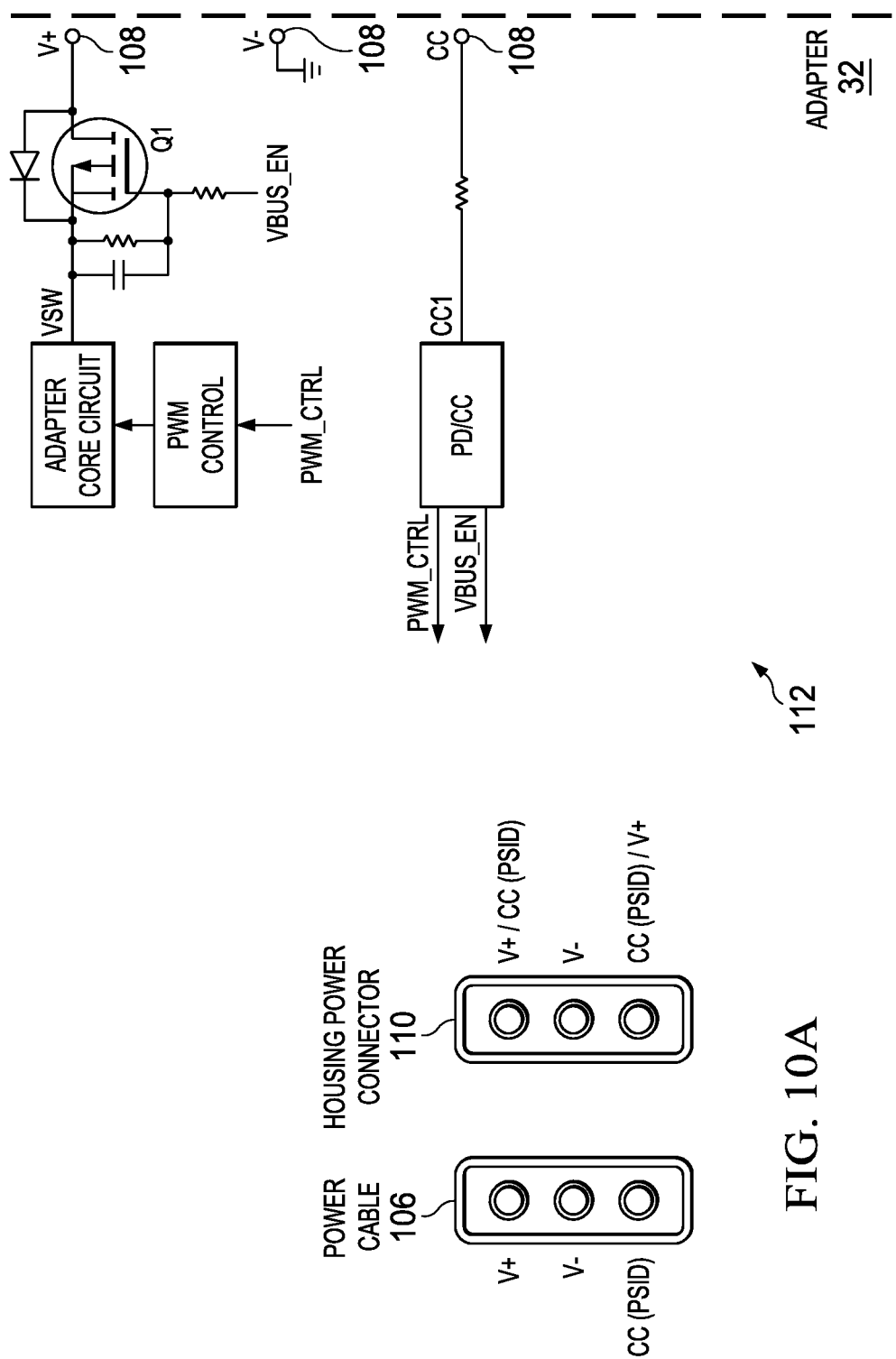
FIGS. 10A and 10B depict a circuit diagram of one example of a power controller that accepts power from a reversible power connector.
Figure 10B:
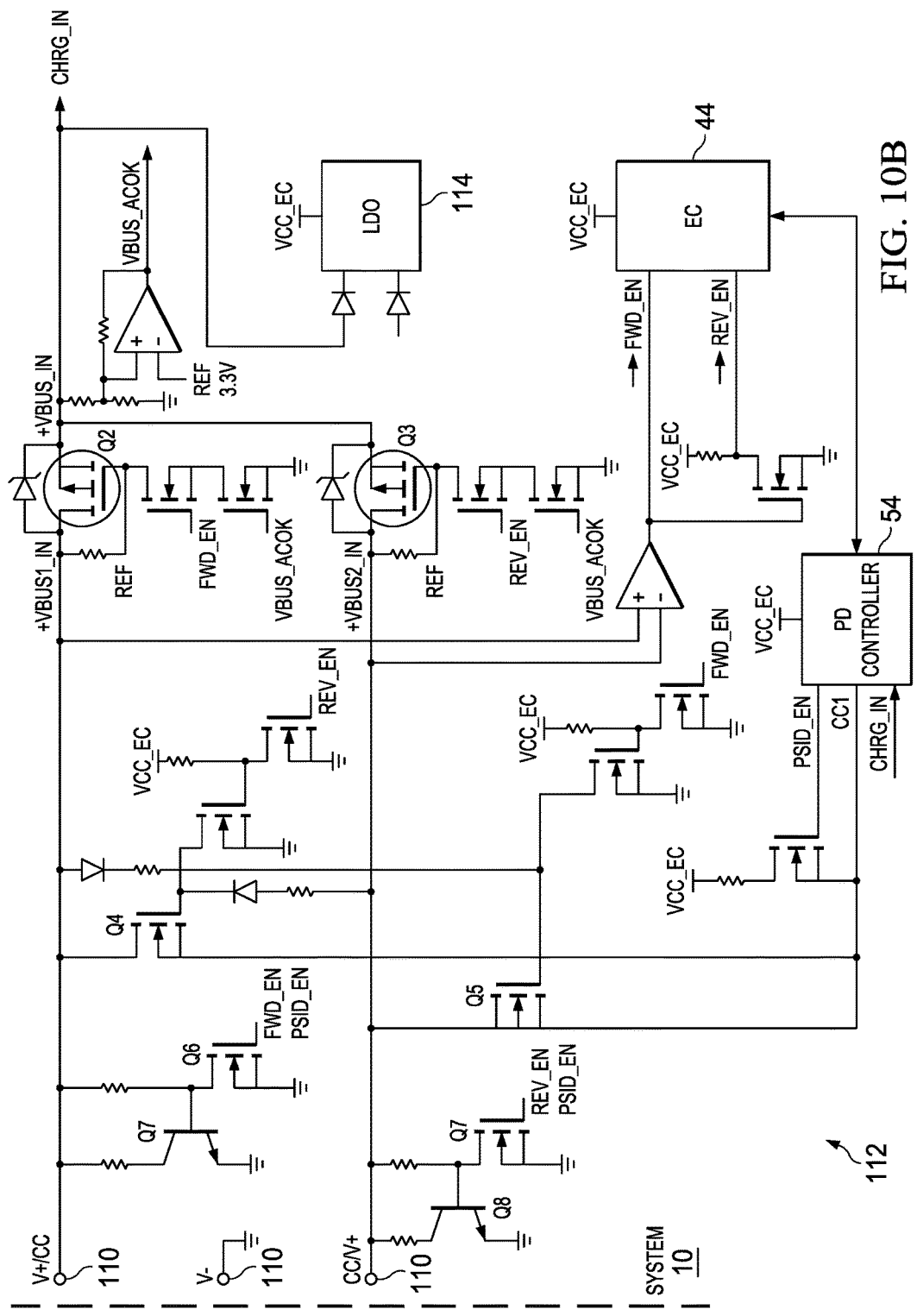

Referring now to FIG. 10, a circuit diagram depicts one example of a power controller that accepts power from a reversible power connector. Power cable connector 106 has three pins disposed in a linear configuration and having a ground pin in the center location with power and communication pins located at end positions. The housing power connector 110 also has three pins in a linear arrangement, however, the power and communication pin locations on opposing ends of the linear arrangement are configurable depending upon the orientation of power cable 106. Power controller circuit 112 detects the orientation of power cable 106 relative to power connector 110 and configures the outer two pins to accept power or communication based upon a determination of the power cable pin that has contacted it. In other words, the housing power connector outer pins adapt by automated configuration to perform either current of information transfer based upon the orientation at which the power cable couples to the housing.

When power adapter 32 pins 108 contact information handling system pins 110, ground is known since ground is located in a middle position, but power and communication pins may align on either side of information handling system 10 based upon power cable orientation. Power controller circuit 112 determines which outer pin 110 has connected to power and which has connected to communication, and then configures itself to accept power and communications accordingly. In at idle state awaiting a power cable connection, Q8 is self-biased ON by Vrp provided at the power V+ and communication CC nodes. At connection of a power cable connector pins 108 to pins 110, the external adapter detects Rd and in response outputs 5V at Vbus for the V+ pin and broadcasts power source capability through the CC pin. The 5V of power travels via Q2 to a low drop out regulator (LDO) 114 that outputs Vcc_ec to power embedded controller 44 to execute a power manager that manages power input at housing power connector 110.

Once embedded controller 44 is powered by LDO 114, a power manager stored in flash memory executes to boot the embedded controller in a pre-BIOS mode that allows determination of the orientation of power cable 106 relative to power connector 110. In the example embodiment, embedded controller 44 reads the value of pin FWD_EN and optionally REV_EN to set the pins 110 for power or communication inputs. After the embedded controller negotiates power transfer characteristics, using the communications line CC, power transfer ramps up on the power line until Vbus_in exceeds the set ACOK limit, at which time embedded controller 44 enables Q2 to set the input current line to charger 54. In this manner, higher current levels are passed to charger 54 after the power-in line is identified.

Figure 11:
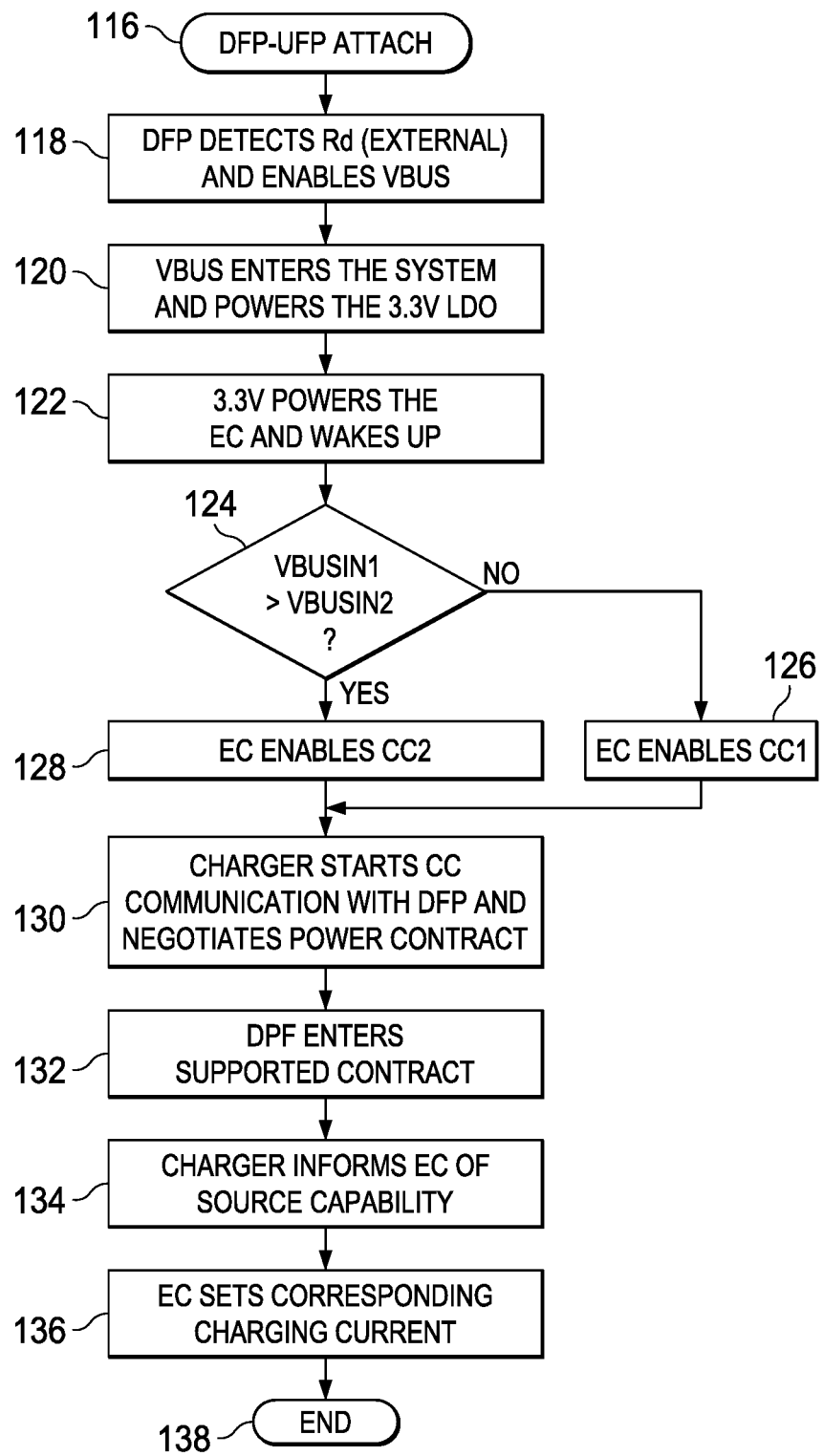
FIG. 11 depicts a flow diagram of one example of a process for managing power provided at a reversible power connector.

Referring now to FIG. 11, a flow diagram depicts one example of a process for managing power provided at a reversible power connector. The process starts at step 116 with attachment of an external power source to a housing connector. At step 118, the external power source detects the connection Rd and in response enables voltage at Vbus to output voltage from the power sources to the housing connector. At step 120, the voltage from Vbus enters the connector with adequate current power an LDO with a minimal output to an embedded controller, such as 15 mA. At step 122, power provided from the LDO boots the embedded controller to a pre-BIOS operational state. The LDO powers the embedded controller with Vbus provided at either of the outside connection pins. At step 124, the embedded controller analyzes the power in to determine which housing connector pin is receiving the power by determining which connector pin has a higher voltage state. If the Vbus1 has a lower voltage, the process continues to step 126 to enable bus line 1 as the communication link. If Vbus1 has a higher voltage, the process continues to step 128 to enable bus line 2 as the communication link. At step 130, the charger in the information handling system initiates a power handshake through the communication line to negotiate a power exchange contract. At step 132, the external power source initiates power transfer at the negotiated contract. At step 134, the charger provides the negotiated power transfer contract information to the embedded controller and, at step 136, the embedded controller sets the power transfer based upon system need. The process ends at step 138 with the information handling system and external power source configured to exchange power with correctly configured power and communication lines.

Figure 12A:
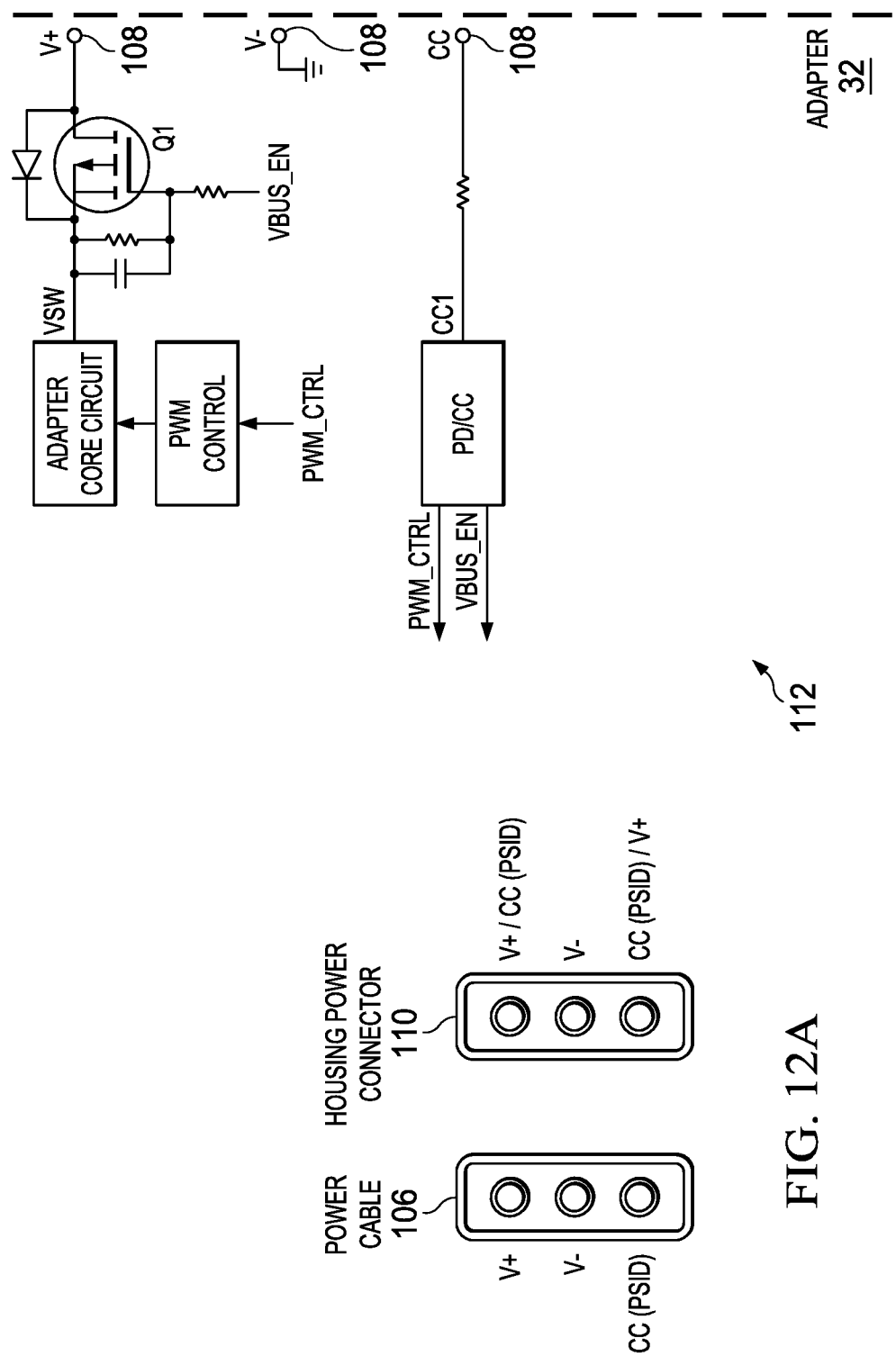
FIGS. 12A and 12B depict a circuit diagram of another example of a power controller that accepts power from a reversible power connector.
Figure 12B:
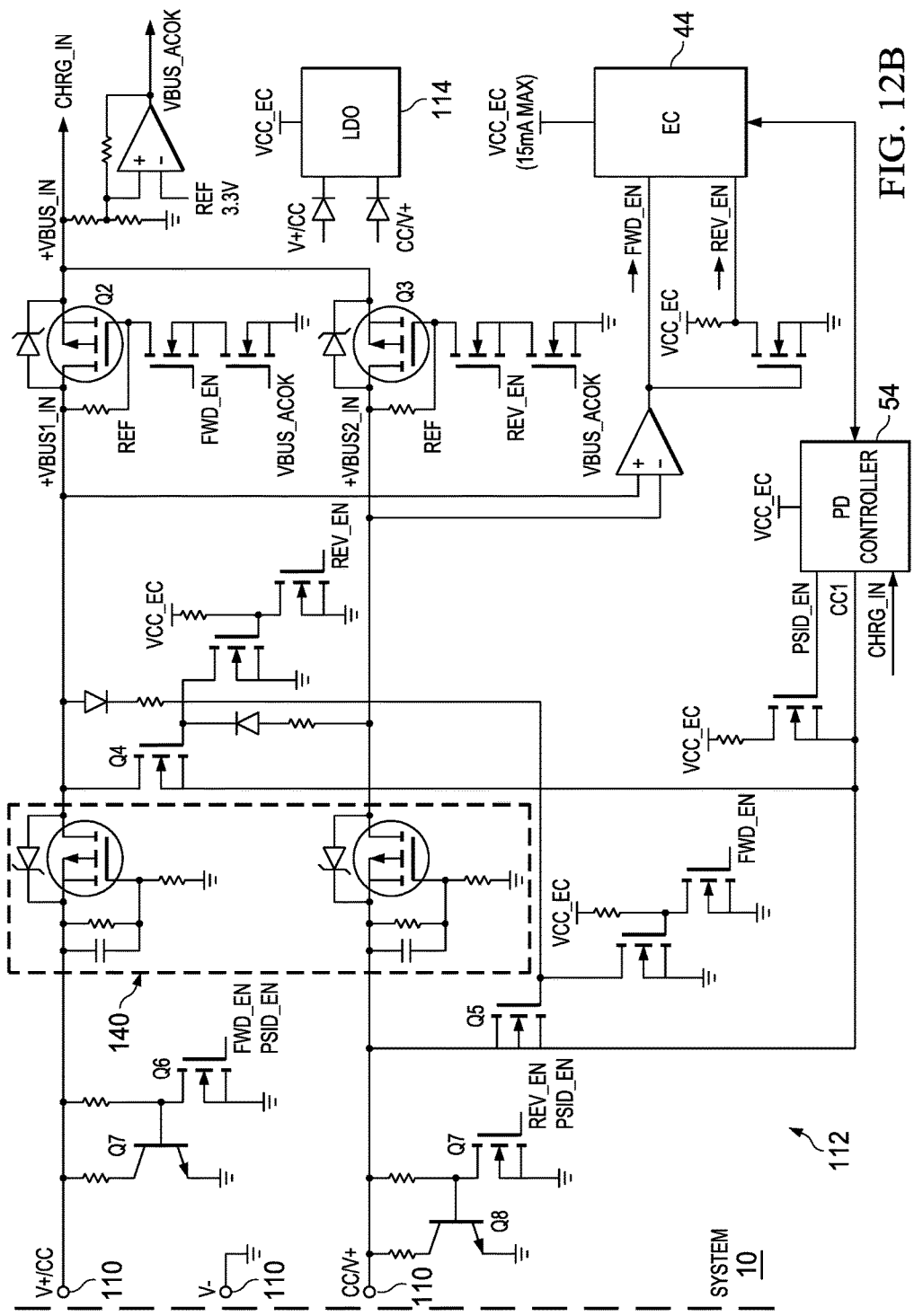

Referring now to FIG. 12, a circuit diagram depicts another example of a power controller that accepts power from a reversible power connector. In the example embodiment of FIG. 12, a manufacturer specific power system identifier (PSID) is communicated to provide external power source characteristics instead of standardized CC power communications. Embedded controller first attempts communication with a standardized CC protocol and, if communication is not found, determines that the connector is not a Type C USB connector. In response, embedded controller 44 initiates alternative power protocol communications using vendor specific and/or USB 2 communication protocols to establish power transfer. A soft start FET 140 is disposed on the communication and power lines to prevent arching or other damage in the event of a current in rush from a 20V power source. In addition, if an external power adapter is detected but Rd is not detected, embedded controller 44 checks an AC_OK signal to determine the proper type of protocol ID, such as a vendor specific PSID or a microUSB 2.0 connector. For example, if a 5V input is detected without a Type C Rd indication, a microUSB is determined; and if a voltage of greater than 5V is detected without a Type C Rd indication, a vendor specific power source is determined.

Figure 13:
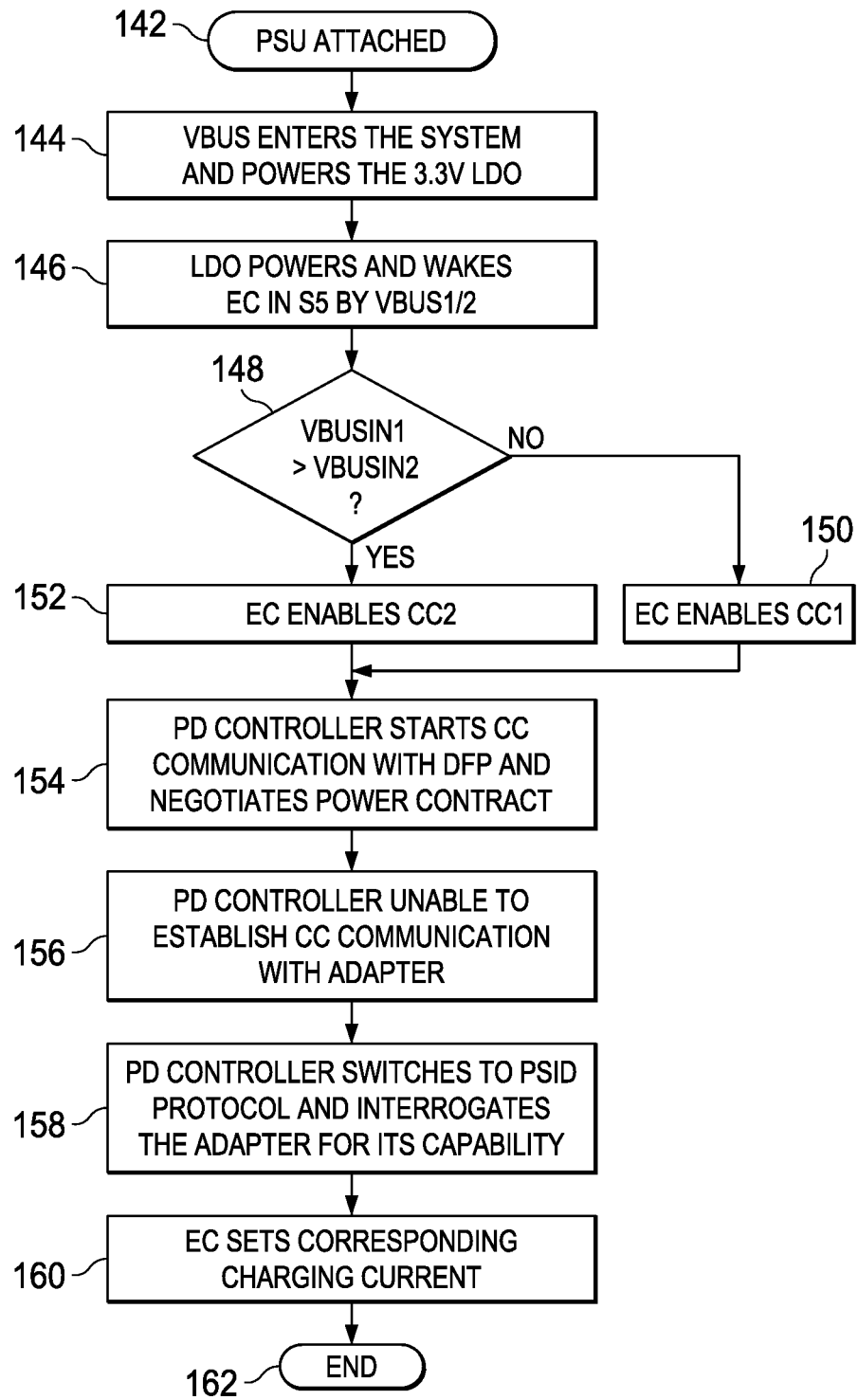
FIG. 13 depicts a flow diagram of another example of a process for managing power provided at a reversible power connector.

Referring now to FIG. 13, a flow diagram depicts another example of a process for managing power provided at a reversible power connector. The process starts at step 142 with connection of an external power source, provides power through an LDO to the embedded controller at step 144, and initiates pre-BIOS logic of the embedded controller at step 146. At step 148, the line that accepts the 5V is identified so that the appropriate communication line is configured at either step 150 or 152. At step 154, the charger starts Type C CC logic to identify the power source and negotiate the power transfer. At step 156, failure of power source identification is detected, for example by a lack of response to a CC protocol message. At step 158, the embedded controller initiates power handshakes by alternative protocols, such as USB 2 protocols or manufacturer specific PSID protocols. At step 160, embedded controller 44 sets an appropriate power configuration based upon successful communications with an alternative protocol and, at step 162 the process ends.

Although the present invention has been described in detail, it should be understood that various changes, substitutions and alterations can be made hereto without departing from the spirit and scope of the invention as defined by the appended claims.

What is claimed is:
1. An information handling system comprising:
a housing;
a processor disposed in the housing and operable to execute instructions to process information;

a memory disposed in the housing and interfaced with the processor, the memory operable to store the information;

at least one communication port disposed in the housing, the at least one communication port operable to accept a cable configured for a communication protocol having power transfer through the cable;

a power connector disposed in the housing and operable to accept a power cable that provides power from an external power supply;

a power controller interfaced with the at least one communication port and the power connector to accept power for application to the processor and memory, the power controller simultaneously accepting power from both the communication port and the power connector; and a motion detector interfaced with the power controller and operable to detect motion of a cable in the communication port, the motion detector communicating detected motion to the power controller;

wherein the power controller in response to detected motion manages current droop associated with power supplied at the power connector by adapting to supply power with reduced impedance from only the power connector without power from the communication port before loss of power from the communication port.

2. The information handling system of claim 1 wherein the motion detector comprises a switch activated by insertion of the cable into the port, the switch detecting withdrawal of the cable from the port before a power line of the cable disconnects from a power line of the port.

3. The information handling system of claim 1 wherein the communication port comprises a USB port.

4. The information handling system of claim 1 wherein the communication port comprises a graphics port.

5. The information handling system of claim 1 wherein the power controller adapts to supply power without power from the communication port by commanding a decrease in power draw through the communication port before loss of power from the communication port.

6. The information handling system of claim 1 wherein the power controller adapts to supply power without power from the communication port by temporarily supplementing current from an integrated battery before loss of power from the communication port and reducing current from the integrated battery after loss of power from the communication port.

7. The information handling system of claim 1 wherein the power controller adapts to supply power without power from the communication port by increasing current from a second communication port.

8. The information handling system of claim 1 wherein the power controller adapts to supply power without power from the communication port by increasing current from the power connector.

9. A method for managing power at an information handling system, the method comprising:

powering the information handling system simultaneously with first and second external power sources through first and second cables connected at first and second ports, at least one port comprising a data cable port;

monitoring the first and second ports to detect a withdrawing motion of the cables from the ports;

detecting a withdrawing motion of the first cable from the first port; and in response to the detecting, adapting the powering to manage current droop at powering with only the second cable before the withdrawing removes power provided by the first cable, the adapting including at least reducing current draw by the information handling system before the withdrawing removes power provided by the first cable.

10. The method of claim 9 wherein the detecting a withdrawing further comprises moving a spring contact of the port to signal the withdrawing before a power line of the cable disengages a power connector of the port.

11. The method of claim 9 wherein the detecting the withdrawing further comprises detecting motion of the cable relative to the port with an infrared sensor.

12. The method of claim 9 wherein the detecting the withdrawing further comprises detecting motion of the cable relative to the port with a Hall sensor.

13. The method of claim 9 wherein both the first and second ports comprise data cable ports that interface with peripheral devices through data cables.

14. The method of claim 13 wherein powering the information handling system further comprises combining power from the first and second ports at a power controller, the power controller drawing a predetermined maximum current, the first and second ports providing less than the predetermined maximum current individually and greater than the predetermined current cumulatively.

15. A cable port comprising:

a housing configured to accept a data cable;

plural data lines disposed in the housing and aligned to interface with data lines of the data cable;

one or more power lines disposed in the housing and aligned to interface with one or more power lines of the data cable;

a motion detector disposed proximate the housing and oriented to detect movement of the data cable; and a power controller interfaced with the motion detector, the power controller operable to simultaneously draw power from both a power port and one or more of the plural data cable power lines, the power controller managing current droop associated with removal of a data cable detected by the motion detector by transitioning to draw power from only the power port and disabling power draw from the one or more data cable power lines before movement of the data cable disconnects the one or more power lines.

16. The cable port of claim 15 wherein the motion detector comprises a contact switch engaged by the data cable insertion into the housing.

17. The cable port of claim 15 wherein the housing has a USB Type C form factor.

18. The cable port of claim 15 wherein the housing comprises a graphics cable connector form factor.

19. The cable port of claim 15 wherein the power controller is further operable to coordinate bi-directional power transfer through the one or more power lines.

20. The cable port of claim 15 wherein the power controller supplements power with a battery before the data cable disconnects power from the port.

* * * * *